H. A. BORRESEN.
CHUCK.
APPLICATION FILED OCT. 14, 1907.
1,153,995.
Patented Sept. 21, 1915.
3 SHEETS—SHEET 1.
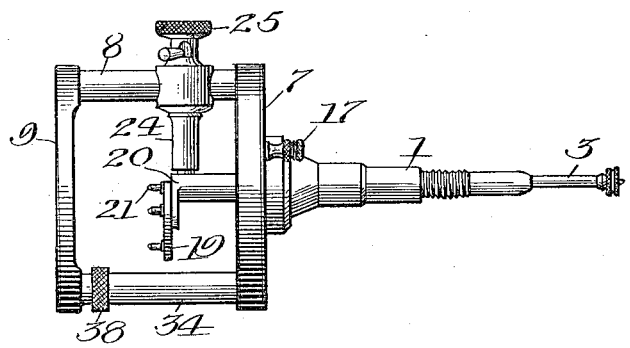
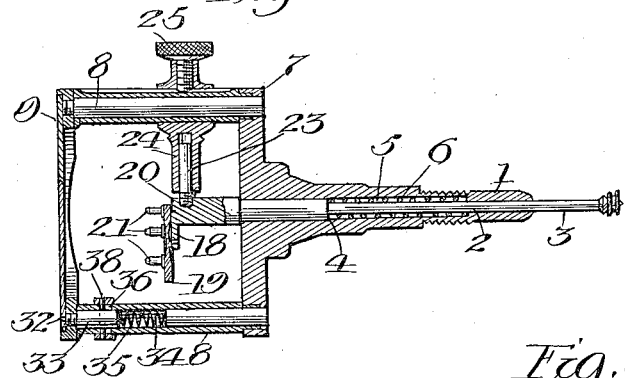
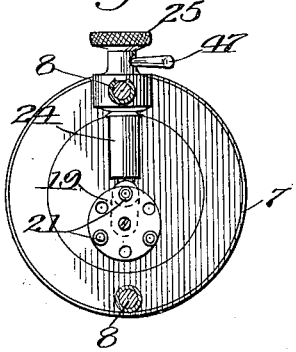
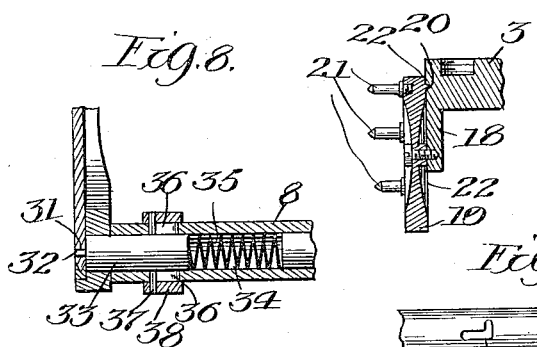
Witnesses:
O. M. Hermies
Helen S. Shedd.
Inventor
Helge A. Borresen
by Benj. T. Roodhouse
Atty

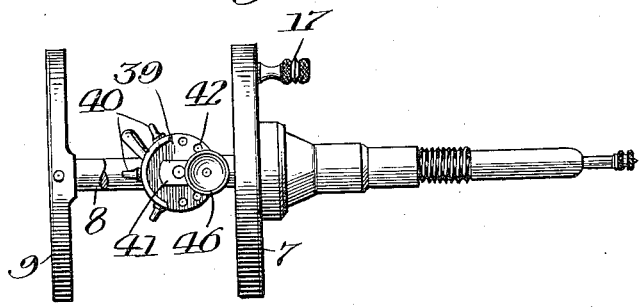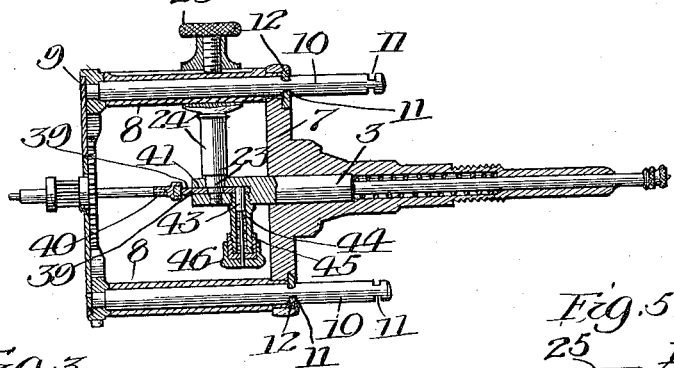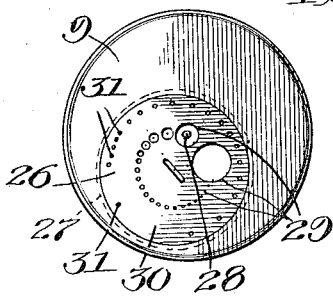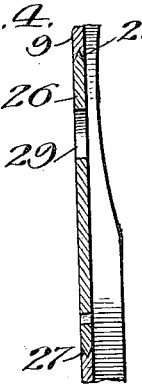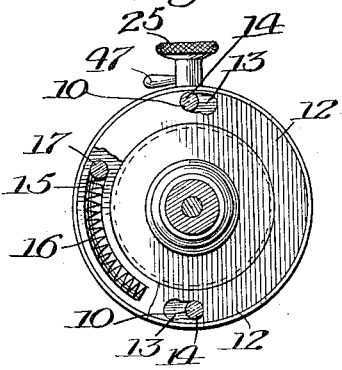

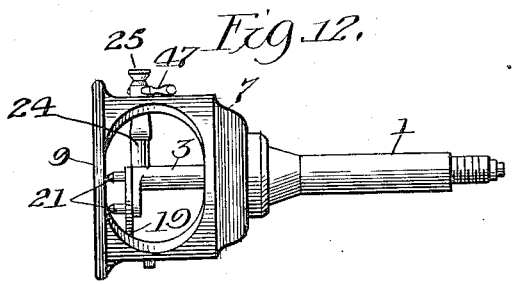
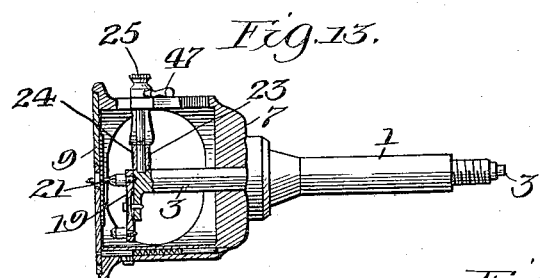
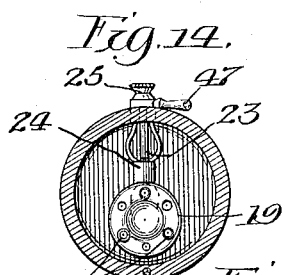
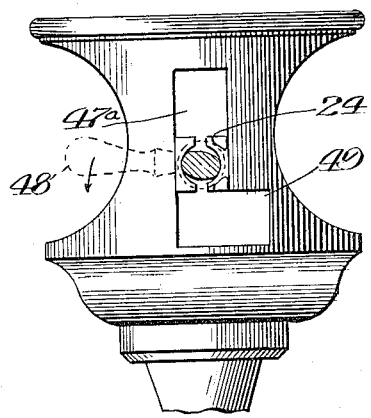
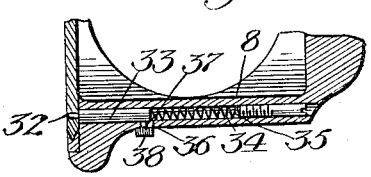

UNITED STATES PATENT OFFICE.

HELGE A. BORRESEN, OF MARQUETTE, MICHIGAN, ASSIGNOR TO MAX W. ZABEL, TRUSTEE, OF CHICAGO, ILLINOIS.

CHUCK.

1,153,995.  Specification of Letters Patent.  Patented Sept. 21, 1915.

Application filed October 14, 1907. Serial No. 397,327.

*To all whom it may concern:*

Be it known that I, HELGE A. BORRESEN, a citizen of the United States, residing in the city of Marquette, in the county of Marquette and State of Michigan, have invented a new and useful Chuck, of which the following is a specification.

My invention relates to improvements in chucks, in which the work is held against and caused to protrude from a front or forward plate by a spring actuated holding and centering member.

My chuck is especially applicable in working extremely small material, such as watch and clock parts, although it may be used to equal advantage in certain forms of heavy machining.

The special objects of my invention are: First, to provide a chuck in which the work can be readily inserted, and which will automatically center the work upon its insertion. Second, to provide an extension chuck which is capable of holding objects of considerable difference in size. Third, to provide adjustable means for holding a number of sizes of objects to center. I attain these objects by the mechanism illustrated in the accompanying drawing, in which—

Figure 1, is a central longitudinal section of my improved chuck. Fig. 2, is an elevation of my improved chuck. Fig. 3, is a view of the face plate of my improved chuck. Fig. 4, is a sectional view of a portion of the face plate of my chuck showing the manner of insertion of the centering disk. Fig. 5, is a view of my chuck looking in the rear face of the platform. Fig. 6, is a view of my chuck looking at the same with the face plate removed. Fig. 7, is a detailed sectional view of the end of the spring actuated member, and the disk carried thereby with the centering appliances projecting therefrom. Fig. 8, is a detailed sectional view of the means for stopping the forward centering disk at its respective proper position. Fig. 9, is an elevation of the standard showing slot, 36. Fig. 10, is a sectional view of a chuck provided with means for extending or enlarging same and with a modification of the centering disk carried by the spring actuated member. Fig. 11, is an elevation of a chuck provided with the modification of the centering disk carried by the spring actuated member, shown in Fig. 10. Fig. 12, is a modification of my chuck in which the columns supporting the face plate have been replaced by walls provided with apertures through which to insert the work. Fig. 13, is a view partially in section of the structure shown in Fig. 12. Fig. 14, is a view partially in section of the modification shown in Fig. 12, looking in the direction of the face plate but with the face plate removed. Fig. 15, shows the adaptation of the structure shown in Fig. 8, to the walls of a chuck. Fig. 16, shows a modification of the means for clamping the spring actuated member at the desired point.

Similar numbers of reference refer to similar portions of the several views.

The reference numeral 1, designates an arbor which may be screw threaded or tapered, or fixed in any suitable manner to assemble with the head or tail stock of a lathe. Through the central portion of the arbor, 1, is provided the channel, 2, in which is slidably mounted the rod, 3. A portion of the rod, 3, is cut away to provide the shoulder, 4, and the annular space, 5, to accommodate the compression spring, 6.

The forward end of the arbor, 1, is provided with the transversely extending platform, 7, which I prefer to make in circular form. Rising from the edge or periphery of the platform, 7, are the standards, 8. It is obvious that I may employ walls in the place of the standards without departing from the spirit of my invention. Upon the outer ends of these standards, 8, is mounted the face plate, 9.

In those styles of chucks where it is desired to be able to change and adjust the distance between the platform, 7, and the face plate, 9, the standards, 8, are made in the form of hollow columns, as shown in Fig. 10, and rods, 10, are attached to the face plate, 9, which are adapted to slide in the hollow columns, 8. These rods 10, are provided with reduced transverse slots, 11. In the rear of the platform, 7, is provided a rotatable ring, 12, which has provided in it apertures of the size of the rods, 10, and adjacent thereto other apertures of the size of the reduced portions, 11. These apertures are respectively designated by the reference numerals 13 and 14. In the platform, 7, back of the rotatable ring, 12, is provided the channel, 15, in which is placed the compression spring, 16, which abuts the channel, 15, at one end, and a pin or knob, 17, provided in the rotatable ring, 12, and extending into said channel, 15, to actuate or rotate the rotatable plate, 12, in the proper direction to cause the engagement of the reduced apertures, 14, with the reduced portions, 11, in the rods, 10. When it is desired to change the distance between the platform, 7, and the face plate, 9, the rotatable ring, 12, is moved by means of the knob or pin, 17, so as to bring the apertures, 13, about the rods, 10, and the face plate, 9, is drawn from or pushed toward the platform, 7, until the proper reduced portions, 11, are brought adjacent to the apertures, 14, when the spring, 16, rotates the plate, 12, and causes the reduced apertures, 14, to engage with said reduced portions, 11, and prevent further movement of the face plate, 9.

Upon the forward end of the rod, 3, is provided the bracket, 18, to which is pivoted the disk, 19, the central portion of which, as clearly shown in Figs. 1 and 7, is cut away to make said disk slightly pliable. It will be seen by further reference to Figs. 1, and 7, that said disk 19, extends above and revolves over the central portion, 20, of the rod, 3, which is in the central axis of the chuck, which is provided with a slight indentation. In the outer surface of the disk, 19, and in the circle which passes over said central axis of the chuck are provided various stubs or centers, 21, suitable for holding the work to be placed in the chuck. In the rear surface of the disk, 19, directly under each center or stump are provided projections, 22, which are adapted to engage the depression, 20, in the rod, 3, and accurately center the desired stump or center. Extending transversely from near the top of the rod, 3, is the arbor, 23. Surrounding this arbor, 23, is the piece, 24, the end of which is adapted to surround one of the columns, 8, and which is further provided with the knurled set screw, 25, to engage the column, 8, and maintain the rod, 3, and the disk, 19, at any desired position between the platform, 7, and the face plate, 9.

The method of operation of my chuck involves the idea of providing an aperture in the face plate, 9, and the holding of the work between said face plate, 9, and the centers, 21, so that the portion to be machined will extend through said aperture beyond the outer surface of said face plate. In order, however, to adapt my chuck more perfectly to various characters and dimensions of work, I provide in said face plate, 9, the eccentrically located disk, 26. This disk, as clearly shown in Fig. 4, is formed on its edges with a V-shaped cross section, 27, which fits into a V-shaped channel in the face plate, 9, so as to be rotatable.

It will be perceived by reference to Fig. 3, that the disk, 26, approaches closely to the edge of the face plate, 9, and rotates above the central portion of the chuck. It will be further seen that the portion of the plate, 26, which comes directly above the center of the chuck describes the circular path, 28. With various points in the circle, 28, as a center I provide circular apertures, 29, having various diameters suitable for the work to be performed. About the circle, 28, and near the edge of the disk, 26, I describe another circle, 30, in which I provide small holes, 31, which are adapted to be coincident with a locking pin, 32, when the aperture of the desired diameter, 29, is in the center of the chuck.

The preferred form of locking device, clearly shown in Fig. 8, is provided in one of the columns, 8, or in one of the walls, as shown in Fig. 15, which may replace the columns, 8, and comprises the locking pin, 32, carried upon the stem, 33, which is adapted to slide in a cylindrical hole, 34, provided in said column, 8. I provide in said cylindrical hole, 34, back of the stem, 33, the compression spring, 35, to actuate said pin, 32, into engagement with one of the locking holes, 31. The walls of the column, 8, are cut to provide the slots, 36, through to the hole, 34, and the pin, 37, is provided in the stem, 33, extending through and protruding from said slots, 36. A sliding collar, 38, surrounding said column, 8, is assembled with said pin, 37, by means whereof the pin, 32, can be withdrawn from the locking holes.

In working upon arbors provided with transversely disposed wheels or other parts, the largest aperture in the disk, 26, may be used, and the centers, 21, will accurately center the work by pressing the said wheels or other parts carried by the arbor in contact with the rear face of the plate, 26. Where, however, it is desired to securely hold the front end of the work, the appropriate aperture, 29, is brought to center, and the work is inserted from the back of said plate therethrough, and held firmly in position by means of the stumps or centers, 21, and their connecting mechanism heretofore described.

I have shown in Figs. 10 and 11, a modified arrangement of the disk, 19, wherein in place of said disk, 19, I provide a disk, 39, upon the edge or periphery of which I provide the radially extending tools or centers, 40. To accommodate the disk, 39, I provide in the top of the rod, 3, the slot, 41, in which the disk, 39, revolves upon the arbor, 23, which in this case extends entirely through the rod, 3. By surrounding this arbor, 23, by the stop mechanism, 24, and not attaching it thereto, I have eliminated the liability to carry the stumps or centers away from center, by screwing up the knurled head set screw, 25. To accurately center the tools or centers, 40, I provide in the disk, 39, the apertures, 42, and in the rod, 3, I provide the spring actuated stop pin, 43, which is adapted to engage said apertures, 42, to center the desired stump or center. The stop pin, 43, is carried in the barrel, 44, which is screwed into the rod, 3, said barred, 44, being provided with the cap, 45, which screws thereon and having the stems of the stop pin, 43, protruding therethrough. The stem of the stop pin, 43, is attached to the outer cap, 46, which slides longitudinally upon the cap, 45, to disengage the pin, 43, from the hole, 42.

In Figs. 10 and 13, I have shown the chuck holding an arbor provided with a wheel and pinion. In using the chuck in this way the largest aperture of the disk, 26, may be employed.

In Figs. 2, 5, 6, 12, 13, and 14, I have shown the set screw, 25, provided with a handle, 47, in addition to the knurled head, which is of advantage in manipulating the chuck.

In Fig. 9, I have shown the column, 8, provided with an L-shaped slot, 36, which is adapted to engage with a pin, 37, to retain the stop pin, 32, out of engagement when it is so desired.

In Figs. 12, 13, 14, and 16, in which the columns, 8, are replaced by integral walls extending between the platform, 7, and the face plate, 9, I have shown a modified form of apparatus for locking the spring actuated rod, 3, at the desired distance from the face plate, 9. In this modified form, I still employ the arbor, 23, engaging with said rod, 3, and the piece, 24, sliding longitudinally upon said arbor, 23. But with this modification I form the end of the piece, 24, which protrudes into a slot, 47ª, provided in the wall of said chuck with a slot running through it and a central elliptical aperture. Protruding into this elliptical aperture is an elliptical knob provided with a handle, 48, as clearly shown in Fig. 16. When the elliptical aperture and the elliptical knob coincide the spring actuated rod, 3, is free to move. When, however, the handle, 48, is brought into the position shown in Fig. 16, the long axis of the ellipse is brought into the short axis of the elliptical opening, and the split piece, 24, is extended to engage the walls of the slot, 47ª. As will be seen by further reference to Fig. 16, the channel, 47ª, has an offset portion which provides the shoulder, 49. When the machining operation is completed, the handle, 48, is pressed backward in the direction of the arrow which releases the lock and forces the rod, 3, backward to remove the work. This same action forces the piece, 24, behind the shoulder, 49, which prevents it from again coming forward until it is required for further service.

What I claim as new, and desire to secure by Letters Patent, is:

1. A chuck adapted to support a cylindrical element mounted upon a shaft, comprising a front plate having a plurality of different sized apertures, means for centrally locating any desired aperture, and a centering device, said centering device being adapted to engage the shaft and press the cylindrical element against the front plate, said front plate and centering device coöperating to hold the said work in place.

2. A chuck adapted to support a cylindrical element mounted upon a shaft, comprising a front plate having an aperture, and a centering device having a plurality of differentiated centers, said centering device being adapted to engage the shaft and press the cylindrical element against the front plate, said front plate and centering device coöperating to hold the said work in place.

3. A chuck adapted to support a cylindrical element mounted upon a shaft, comprising a front plate provided with an eccentrically mounted disk having a plurality of different sized apertures adapted for location centrally of said front plate, and a centering device, said centering device being adapted to engage the shaft and press the cylindrical element against the front plate, said front plate and centering device coöperating to hold the said work in place.

4. A chuck comprising a hollow arbor, a transversely extending platform on the end of said arbor, hollow columns extending from the face of said platform, a face plate, rods extending rearwardly from said face plate adapted to slide in said hollow columns, means provided in said platform adapted to engage and hold said rods in a plurality of positions, and longitudinally adjustable means projecting from the hollow in said arbor adapted to hold work to said face plate.

5. In a chuck having a hollow arbor, a face plate having a centrally located aperture carried by and in front of said arbor, a spring actuated member extending from the hollow in said arbor toward said face plate, a depression in said spring actuated member in the axial line of said chuck, a disk carried by said spring actuated member revolving over the axial line of said chuck, having centering appliances attached to its outer face, adapted to be brought successively in the axial line of said chuck, and having projections upon the opposite face of said disk in line with said centering appliances, adapted to engage the depression in said spring actuated member.

6. A chuck having a framework, an arbor movable longitudinally of said framework, and means for locking said arbor in any given position longitudinally of said framework without exerting transverse pressure against said arbor, said arbor being unsupported laterally at the point of contact of said means.

7. A chuck comprising a framework, a thin front plate for said framework having an opening, an annular groove about the periphery of said opening in said plate, and a thin rotatable face plate movable within said opening and held in place within said groove, and spring pressed means to hold and accurately center said face plate in any one of a plurality of desired positions.

8. In a chuck for a lathe, a spring actuated longitudinally movable central arbor having a transverse eccentrically disposed revoluble disk, said disk comprising differentiated supporting tools, and means for locking any of said supporting tools in axial alinement of said chuck.

9. A chuck having a thin face plate, said face plate having an eccentrically disposed revoluble segmental disk of identical thickness, said segmental disk comprising two circular rows of apertures, the innermost row being of differentiated apertures disposed in rotatable relation to the central point of said face plate, and the outermost row being in rotatable coöperation with means for locking said revoluble disk.

10. A chuck comprising a framework having a spring actuated longitudinally operable central arbor, said arbor comprising a transversely disposed rotatable disk having differentiated supporting tools, said framework supporting a thin face plate comprising an eccentrically disposed segmental rotatable disk having differentiated apertures, the aforesaid differentiated supporting tools and the aforesaid differentiated apertures constituting complementary means for supporting objects in axial alinement of said chuck substantially as set forth.

11. A lathe-chuck comprising a hollow arbor containing a spring actuated slidable centering device, the aforesaid hollow arbor supporting a transversely disposed platform comprising two columns, said columns supporting a thin face plate comprising a thin eccentrically disposed revoluble disk, one of the said columns supporting means for controlling the action of the aforesaid slidable centering device, and the other column containing means for locking the aforesaid revoluble disk.

12. A lathe chuck comprising a hollow arbor containing a spring actuated centering device, said hollow arbor having a framework supporting a thin face plate comprising a thin revoluble disk having differentiated apertures, the said revoluble disk and the aforementioned centering device constituting coöperable means for engaging in axial alinement cylindrical elements mounted upon variously sized shafts, substantially as set forth.

In testimony whereof I hereto affix my signature in the presence of two witnesses.

HELGE A. BORRESEN.

Witnesses:
BENJ. T. ROODHOUSE,
HELEN S. SHEDD.

Copies of this patent may be obtained for five cents each, by addressing the "Commissioner of Patents, Washington, D. C."